(12) United States Patent
Lewis (10) Patent No.: US 11,306,919 B2
(45) Date of Patent: Apr. 19, 2022

(54) COMBUSTOR PANEL COOLING HOLE ARRANGEMENT

(71) Applicant: United Technologies Corporation, Farmington, CT (US)

(72) Inventor: Scott D. Lewis, Vernon, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 247 days.

(21) Appl. No.: 16/224,012

(22) Filed: Dec. 18, 2018

(65) Prior Publication Data

US 2020/0124282 A1 Apr. 23, 2020

Related U.S. Application Data (60) Provisional application No. 62/748,049, filed on Oct. 19, 2018.

(51) Int. Cl.
*F23R 3/06* (2006.01)
*F23R 3/50* (2006.01)

(52) U.S. Cl.
CPC .............. *F23R 3/06* (2013.01); *F23R 3/50* (2013.01); *F05D 2240/35* (2013.01); *F05D 2260/202* (2013.01); *F23R 2900/03042* (2013.01)

(58) Field of Classification Search
CPC .......... F23R 3/06; F23R 3/12; F05D 2260/20; F05D 2260/202; F05D 2260/203; F05D 2260/221
See application file for complete search history.

(56) References Cited

U.S. PATENT DOCUMENTS

| | | | | |
|---|---|---|---|---|
| 7,093,439 | B2* | 8/2006 | Pacheco-Tougas | F23R 3/002 60/752 |
| 7,146,816 | B2* | 12/2006 | Anderson | F23R 3/002 60/772 |
| 7,506,512 | B2* | 3/2009 | Schumacher | F23R 3/12 60/754 |

(Continued)

FOREIGN PATENT DOCUMENTS

| | | |
|---|---|---|
| WO | 2013192540 A1 | 12/2013 |
| WO | 2015112221 A2 | 7/2015 |

OTHER PUBLICATIONS

The Extended European Search Report for Application No. 19204436.0-1009; Report dated Dec. 17, 2019; 9 pages.

*Primary Examiner* — Alain Chau
*Assistant Examiner* — Sean V Meiller
(74) *Attorney, Agent, or Firm* — Cantor Colburn LLP (57) ABSTRACT

A cooling hole arrangement for a combustor panel including a first group of cooling holes, each of the first cooling holes extending from a first inlet to a first outlet. Also included is a second group of cooling holes, each of the second cooling holes extending from a second inlet to a second outlet, each of the first cooling holes and the second cooling holes spaced from an edge of the combustor panel in an axial direction to be arranged substantially parallel to the edge of the combustor panel. At least a portion of the first inlet of each first cooling holes is axially overlapped with a portion of the second inlet of the second cooling holes. The first outlet of each of the first cooling holes is closer to the edge of the combustor panel than the second outlet of the second cooling holes is to the edge.

15 Claims, 6 Drawing Sheets

(56) References Cited

U.S. PATENT DOCUMENTS

| | | | |
|---|---|---|---|
| 7,874,159 B2* | 1/2011 | Gerendas | F23R 3/002 |
| | | | 60/752 |
| 9,897,320 B2 | 2/2018 | Bronson et al. | |
| 10,041,677 B2 | 8/2018 | Fitzpatrick et al. | |
| 2007/0209366 A1 | 9/2007 | Gerendas et al. | |
| 2016/0054001 A1* | 2/2016 | Bangerter | F23R 3/007 |
| | | | 60/772 |
| 2016/0281988 A1* | 9/2016 | Tu, Jr | F23R 3/002 |
| 2018/0031237 A1* | 2/2018 | Kamoi | F23R 3/286 |
| 2018/0231252 A1* | 8/2018 | Clemen | F02K 3/06 |

\* cited by examiner

COMBUSTOR PANEL COOLING HOLE ARRANGEMENT

CROSS-REFERENCE TO RELATED APPLICATIONS

This application claims the benefit of U.S. Provisional Application No. 62/748,049 filed Oct. 19, 2018, which is incorporated herein by reference in its entirety.

BACKGROUND

Exemplary embodiments pertain to the art of gas turbine engines and, more particularly, to a combustor panel cooling hole arrangement.

Gas turbine engine combustor panels are exposed to intensely hot temperatures due to heat release from burning fuel. These hot metal temperatures may make the hardware prone to oxidation and thermal mechanical fatigue failure modes. The combustor panels are cooled to ensure that the panels meet the life requirement. Engine testing has shown that the leading edge of the aft combustor panels is an area that needs significant cooling to prevent distress from occurring, especially on the outer boundary liner panel. Thick combustor panels are particularly hard to cool in this area because a minimum distance needs to be maintained between the cooling holes.

BRIEF DESCRIPTION

Disclosed is a cooling hole arrangement for a combustor panel including a first group of cooling holes, each of the first group of cooling holes extending from a first inlet to a first outlet. Also included is a second group of cooling holes, each of the second group of cooling holes extending from a second inlet to a second outlet, each of the first group of cooling holes and the second group of cooling holes spaced from an edge of the combustor panel in an axial direction to be arranged substantially parallel to the edge of the combustor panel. At least a portion of the first inlet of each first group of cooling holes is axially overlapped with a portion of the second inlet of the second group of cooling holes. The first outlet of each of the first group of cooling holes is closer to the edge of the combustor panel than the second outlet of the second group of cooling holes is to the edge.

In addition to one or more of the features described above, or as an alternative, further embodiments may include that the first inlets of first group of cooling holes and the second inlets of the second group of cooling holes form a single inlet row, at least a portion of the single inlet row having alternating first inlets and second inlets.

In addition to one or more of the features described above, or as an alternative, further embodiments may include that the first inlets of first group of cooling holes and the second inlets of the second group of cooling holes form a single inlet row, at least a portion of the single inlet row having adjacent first inlets.

In addition to one or more of the features described above, or as an alternative, further embodiments may include that the first inlets of first group of cooling holes and the second inlets of the second group of cooling holes form a single inlet row, at least a portion of the single inlet row having adjacent second inlets.

In addition to one or more of the features described above, or as an alternative, further embodiments may include that each of the first group of cooling holes extend from the first inlet to the first outlet at a first angular orientation, each of the second group of cooling holes extending from the second inlet to the second outlet at a second angular orientation, the first angular orientation ranging from about 10 degrees to about 50 degrees relative to a circumferential direction.

In addition to one or more of the features described above, or as an alternative, further embodiments may include that each of the first group of cooling holes extend from the first inlet to the first outlet at a first angular orientation, each of the second group of cooling holes extending from the second inlet to the second outlet at a second angular orientation, the second angular orientation ranging from about −15 degrees to about 15 degrees relative to a circumferential direction.

In addition to one or more of the features described above, or as an alternative, further embodiments may include that a distance between the second outlet and the edge is about 3 times to about 4 times greater than the distance between the first outlet and the edge.

In addition to one or more of the features described above, or as an alternative, further embodiments may include that a distance between the second outlet and the edge is about 3.4 times greater than the distance between the first outlet and the edge.

In addition to one or more of the features described above, or as an alternative, further embodiments may include that each of the first group of cooling holes extend from the first inlet to the first outlet at a first angular orientation, the first angular orientation not parallel to an oncoming gas flow path direction.

Also disclosed is a cooling hole arrangement for a combustor panel including a first group of cooling holes having a first angular orientation. Also included is a second group of cooling holes having a second angular orientation, the first angular orientation different than the second angular orientation, each of the first group of cooling holes and the second group of cooling holes spaced from a leading edge of the combustor panel in an axial direction to be arranged substantially parallel to the leading edge of the combustor panel.

In addition to one or more of the features described above, or as an alternative, further embodiments may include that each of the first group of cooling holes extends from a first inlet to a first outlet, each of the second group of cooling holes extending from a second inlet to a second outlet, at least a portion of the first inlet of each first group of cooling holes axially overlapped with a portion of the second inlet of the second group of cooling holes, the first outlet of each of the first group of cooling holes being closer to a leading edge of the combustor panel than the second outlet of the second group of cooling holes is to the leading edge.

In addition to one or more of the features described above, or as an alternative, further embodiments may include that the first inlets of first group of cooling holes and the second inlets of the second group of cooling holes form a single inlet row, at least a portion of the single inlet row having alternating first inlets and second inlets.

In addition to one or more of the features described above, or as an alternative, further embodiments may include that the first angular orientation ranges from about 10 degrees to about 50 degrees relative to a circumferential direction.

In addition to one or more of the features described above, or as an alternative, further embodiments may include that the second angular orientation ranging from about −15 degrees to about 15 degrees relative to a circumferential direction.

In addition to one or more of the features described above, or as an alternative, further embodiments may include that a distance between the second outlet and the leading edge is about 3 times to about 4 times greater than the distance between the first outlet and the leading edge.

In addition to one or more of the features described above, or as an alternative, further embodiments may include that the first angular orientation is not parallel to an oncoming gas flow path direction.

Further disclosed is a gas turbine engine including a compressor section, a combustor section, a turbine section, and a cooling hole arrangement for a combustor panel of the combustor section, the combustor panel extending axially from a leading edge to a trailing edge. The cooling hole arrangement includes a first group of cooling holes having a first angular orientation. The cooling hole arrangement also includes a second group of cooling holes having a second angular orientation, the first angular orientation different than the second angular orientation, each of the first group of cooling holes and the second group of cooling holes spaced from the leading edge of the combustor panel in an axial direction to be arranged substantially parallel to the leading edge of the combustor panel.

In addition to one or more of the features described above, or as an alternative, further embodiments may include that each of the first group of cooling holes extends from a first inlet to a first outlet, each of the second group of cooling holes extending from a second inlet to a second outlet, at least a portion of the first inlet of each first group of cooling holes axially overlapped with a portion of the second inlet of the second group of cooling holes, the first outlet of each of the first group of cooling holes being closer to a leading edge of the combustor panel than the second outlet of the second group of cooling holes is to the leading edge.

In addition to one or more of the features described above, or as an alternative, further embodiments may include that the first inlets of first group of cooling holes and the second inlets of the second group of cooling holes form a single inlet row, at least a portion of the single inlet row having alternating first inlets and second inlets.

In addition to one or more of the features described above, or as an alternative, further embodiments may include that the first angular orientation ranges from about 10 degrees to about 50 degrees relative to the circumferential direction.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
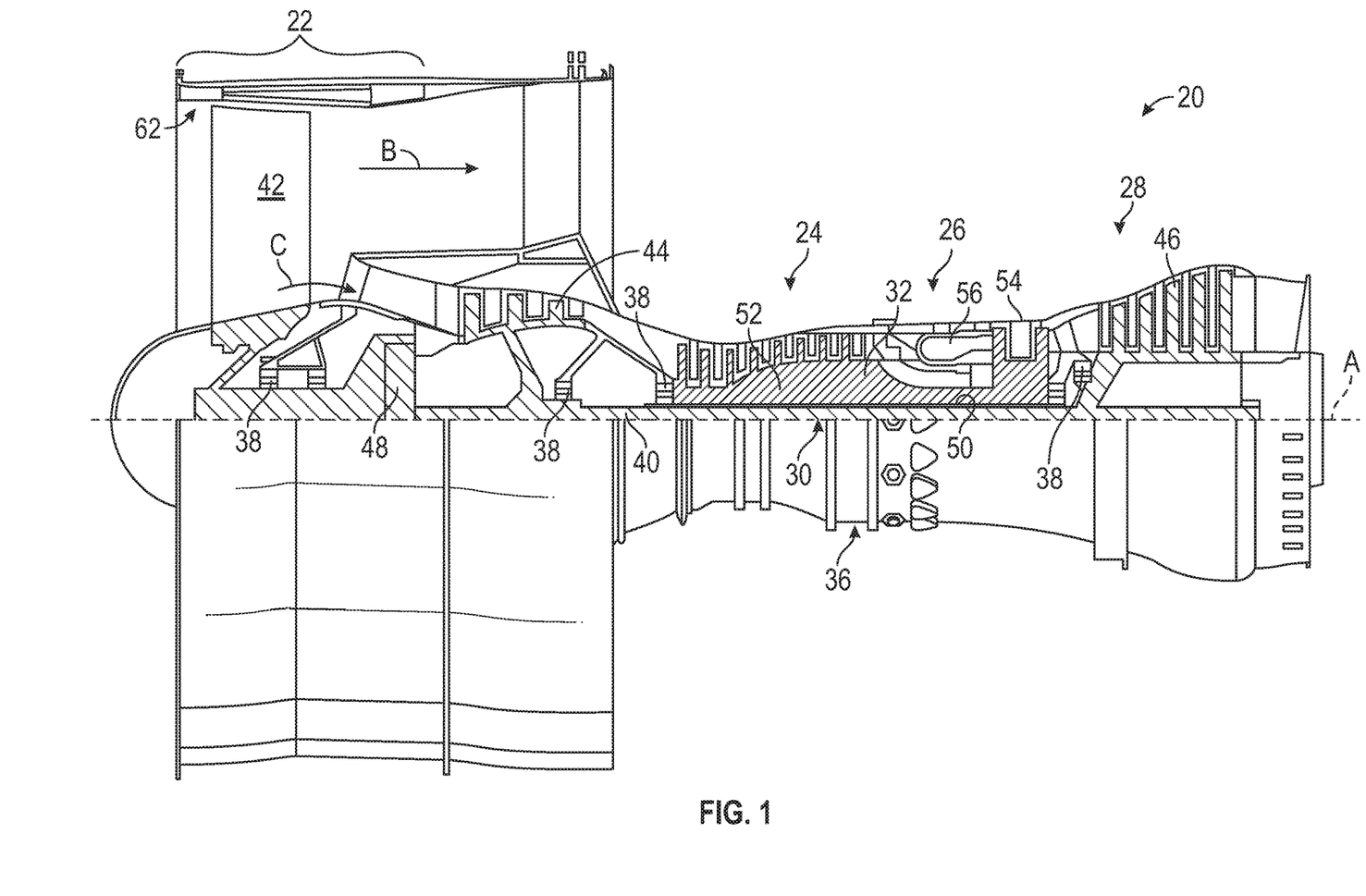
FIG. 1 is a side, partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 feet (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
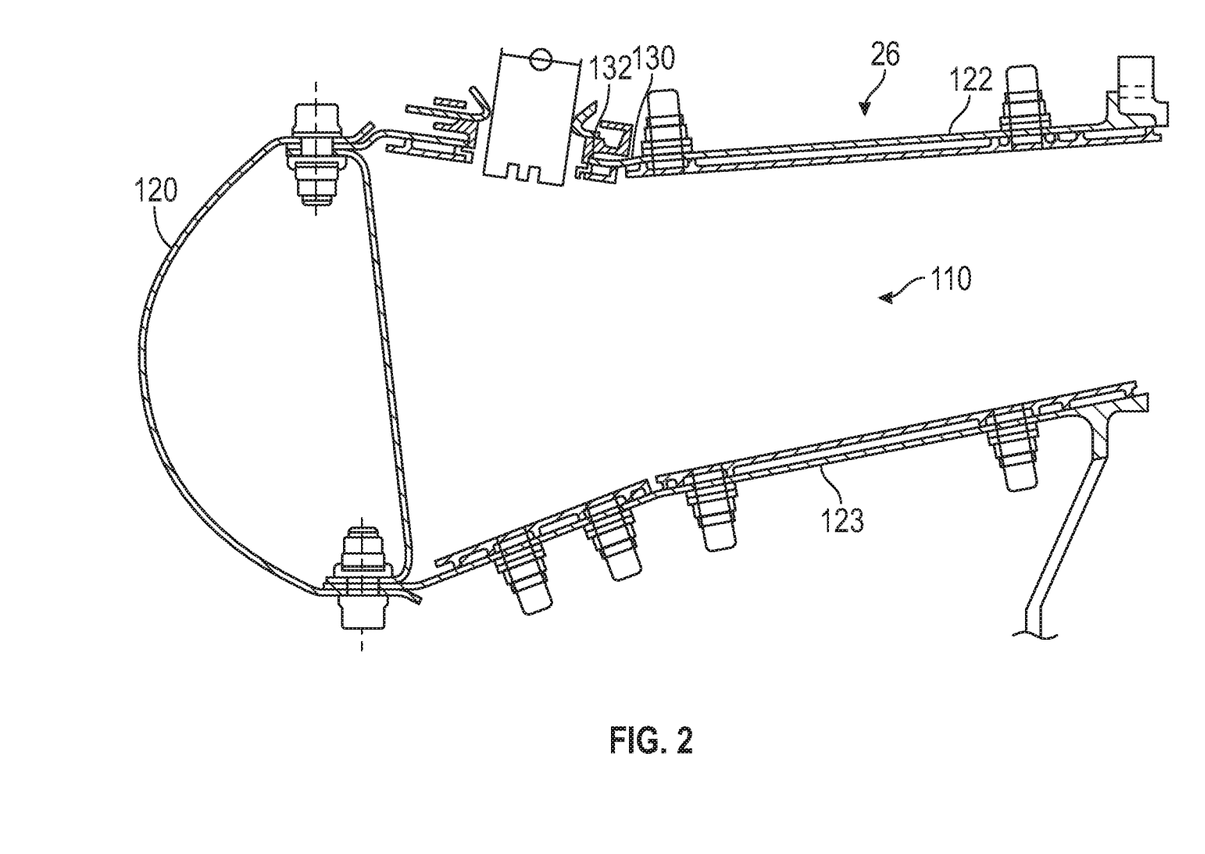
FIG. 2 is a sectional view of a combustor section of the gas turbine engine.

FIG. 2 illustrates a portion of the combustor section 26 in greater detail. The combustor section 26 includes a combustion region 110 in which fuel is combusted. The combustor section 26 is defined by a combustor bulkhead 120, an outer diameter combustor shell 122, and an inner diameter combustor shell 123 that are combined to form an annular combustor assembly. The outer diameter combustor shell 122 and the inner diameter combustor shell 123 are each formed with a plurality of combustor panels that are connected to each other using known fastening techniques. The shells 122, 123 are full hoop sheet metal shells and are designed to handle a pressure load and other mechanical loads. Aft combustor panels 130 are prone to higher temperatures and are therefore at a greater risk for degradation due to oxidation and thermal fatigue. The cooling hole arrangement disclosed herein enhances cooling efforts directed at a leading edge 132 of the aft combustor panels 130, however, it is to be appreciated that any edge portion of any gas turbine structure requiring cooling may benefit from the embodiments disclosed herein.

Figure 3:
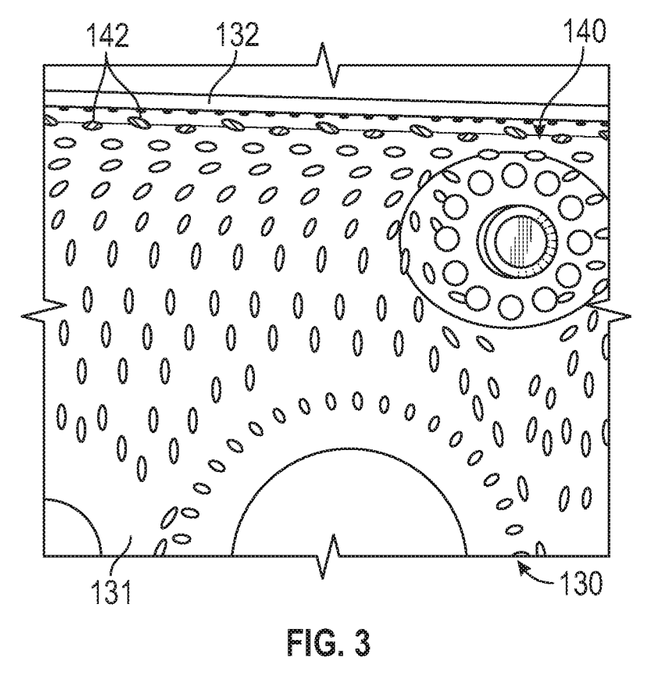
FIG. 3 is a perspective view of an outer surface of a leading edge portion of a combustor panel illustrating a plurality of cooling hole inlets.

Referring now to FIG. 3, a portion of the aft combustor panels 130 is illustrated in greater detail. In particular, an outer surface 131 of the aft combustor panels 130 located proximate the leading edge 132 is shown. The leading edge 132 of the aft combustor panels 130 includes a cooling hole arrangement 140 to avoid the above-described issues. The aft combustor panel 130 extends in an axial direction from the leading edge 132 to a trailing edge.

The cooling hole arrangement 140 includes a plurality of cooling holes that are the cooling holes located closest to the leading edge 132, relative to other cooling holes located further downstream. As shown in FIG. 3, each cooling hole has an inlet 142 arranged in substantially a single row. A single row is defined by at least a portion of each cooling hole being distanced from the leading edge 132 in an overlapping manner with the remainder of the cooling hole inlets 142 (i.e., at least partially circumferentially in-line with each other). Although the cooling hole inlets 142 are arranged in a single row, the angular orientation of each inlet 142 is different from at least one other inlet 142. In particular, some of the cooling holes are angled toward the leading edge 132 of the aft combustor panel 130, when travelling from the inlet 142 to a cooling hole outlet. Therefore, some of the cooling holes angle axially toward the leading edge 132 to enhance the cooling effect on the leading edge 132, while maintaining required spacing from other holes and from rail holes located on the leading edge 132.

Figure 4:
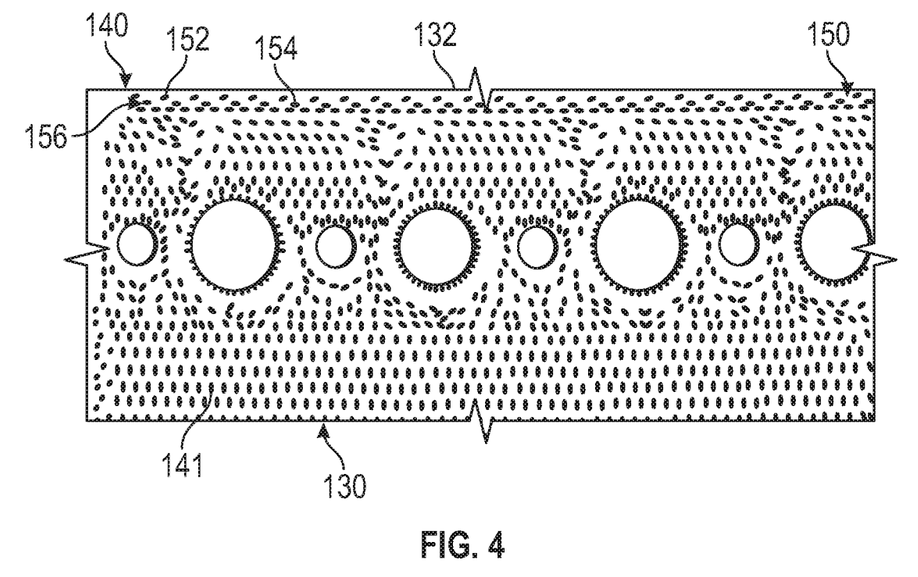
FIG. 4 is a perspective view of an inner surface of the leading edge portion of the combustor panel illustrating a plurality of cooling hole outlets.

FIG. 4 illustrates an inner surface 141 of the aft outer combustor panel 130 to show cooling hole outlets for the cooling hole arrangement 140. As shown, a first group of cooling holes 150 are angled toward the leading edge 132 to place the first group of outlets 152 closer to the leading edge 132, relative to a second group of outlets 154 of a second group of cooling holes 156. Although illustrated as being located in close proximity to (e.g., adjacent to) the leading edge 132 of the aft combustor panel 130, it is to be appreciated that the cooling hole arrangement 140 described herein may be provided in close proximity to (e.g., adjacent to) a trailing edge of some combustor panels. For example, a forward combustor panel may benefit from inclusion of the cooling hole arrangement 140 on a trailing edge thereof.

In the illustrated embodiments, the first group of cooling holes 150 and the second group of cooling holes 156 are arranged in an alternating manner. However, it is to be appreciated that alternative arrangements may be utilized in some embodiments. For example, two adjacent first cooling holes 150 (i.e., angled toward leading edge) may be present between one of the second cooling holes 156. By way of another example, two adjacent second cooling holes 156 may be present between one of the first cooling holes 150. The above-described examples may be repeated or different patterns along the circumferential distance of the aft combustor panel may be utilized. As one can understand, various other arrangements are contemplated. Regardless of the particular pattern, the pattern may be used along an entire circumferential distance of the aft combustor panel 130 or along only a portion thereof.

As described above, the aft combustor panel 130 extends axially from the leading edge 132 to the trailing edge. The first group of cooling holes 150 and the second group of cooling holes 156 are each spaced from the leading edge 132 of the aft combustor panel 130 in an axial direction. In some embodiments, the first and second groups of cooling holes 150, 156 axially overlap with each other for at least a portion of each group's cooling holes.

Figure 5:
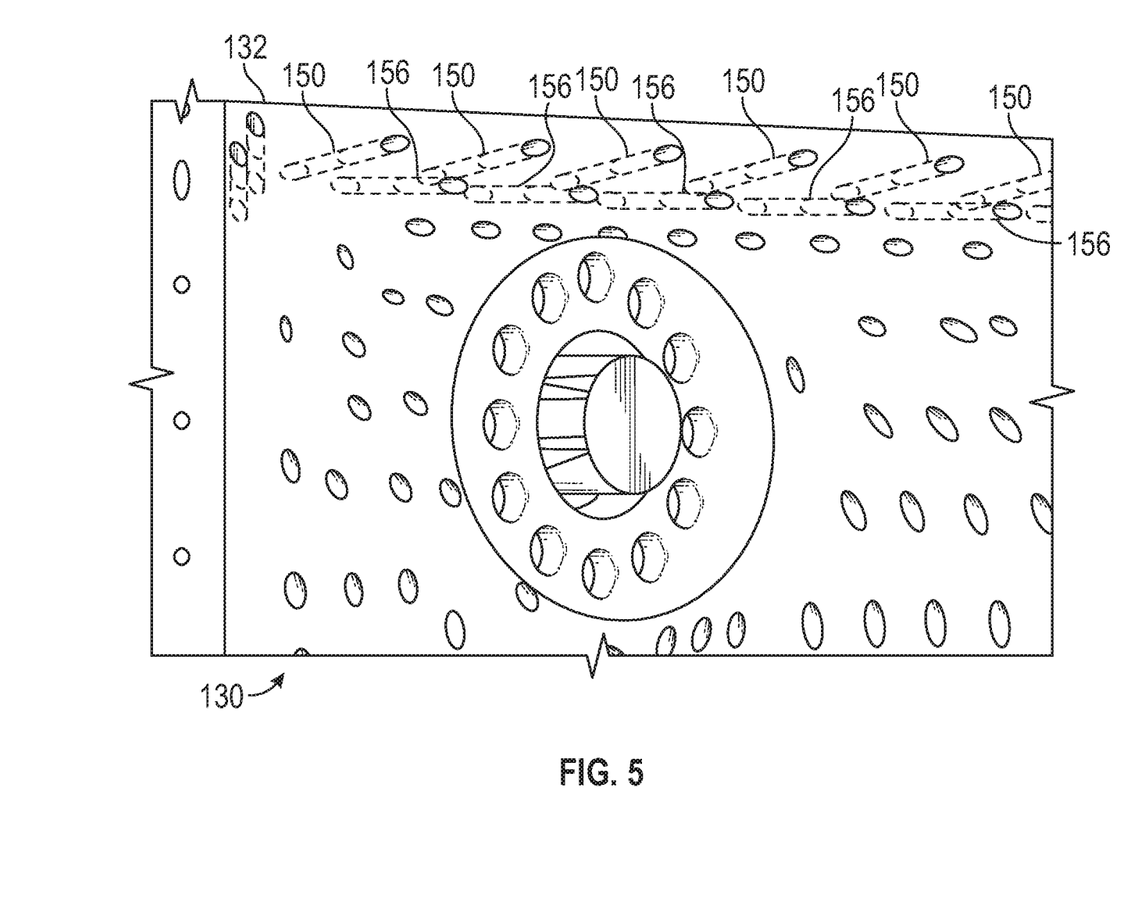
FIG. 5 is a transparent view of the inner surface of the leading edge portion of the combustor panel illustrating cooling hole angles.
Figure 6:
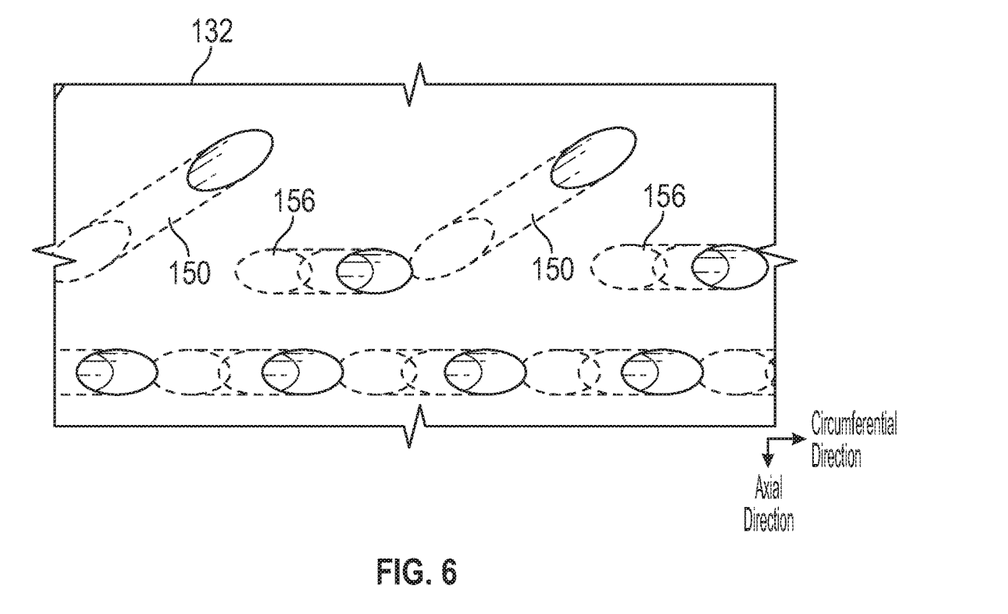
FIG. 6 is an enlarged view of a portion of FIG. 5 illustrating the cooling hole angles.

Referring now to FIGS. 5 and 6, the aft combustor panel 130 is transparently shown to better illustrate the angular orientation of the first cooling holes 150 and the second cooling holes 156. The angular orientation of the first cooling holes 150 may range from about 10 degrees to about 50 degrees relative to the circumferential direction (FIG. 6). The first cooling holes 150 angle radially through the thickness of the aft combustor panel 130 at an angle ranging from about 18 degrees to about 40 degrees. The second cooling holes 156 are angled to extend circumferentially in a manner that is substantially parallel to the leading edge and do not angle toward the leading edge 132 in a significant manner. For example, the second cooling holes 156 may be slightly angled, but have an angular orientation that ranges from about −15 degrees to about 15 degrees relative to the circumferential direction (FIG. 6). The second cooling holes angle radially through the thickness of the aft combustor panel 130 at an angle ranging from about 18 degrees to about 40 degrees. The second cooling holes 156 are oriented for good filming performance and ensure long distances are not present where no cooling holes are present.

Figure 7:
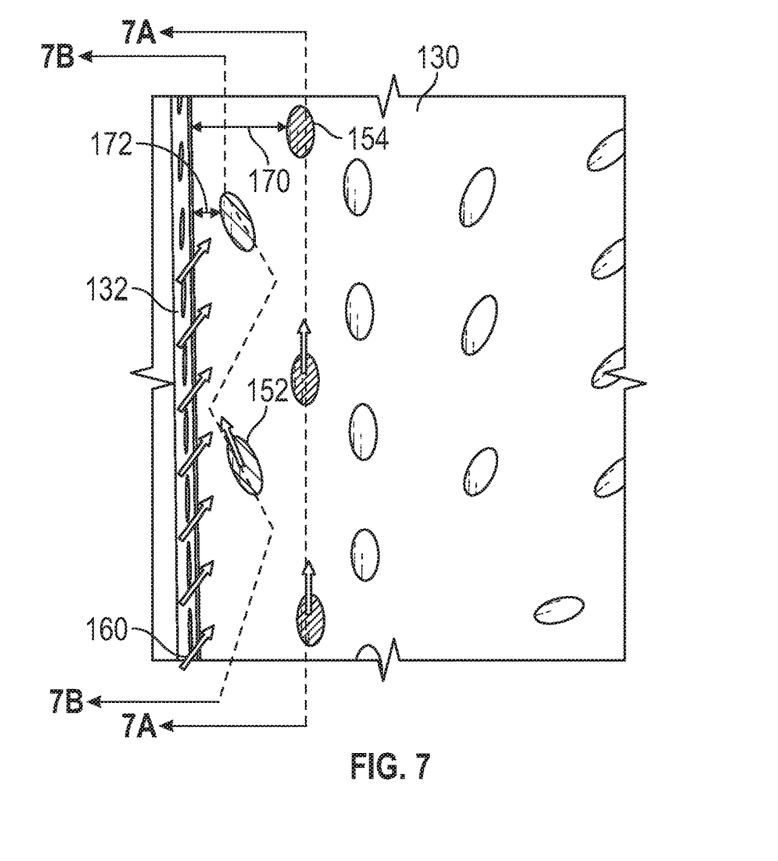
FIG. 7 is an elevational view of the inner surface of the leading edge portion of the combustor panel according to another aspect of the disclosure.
Figure 7A:
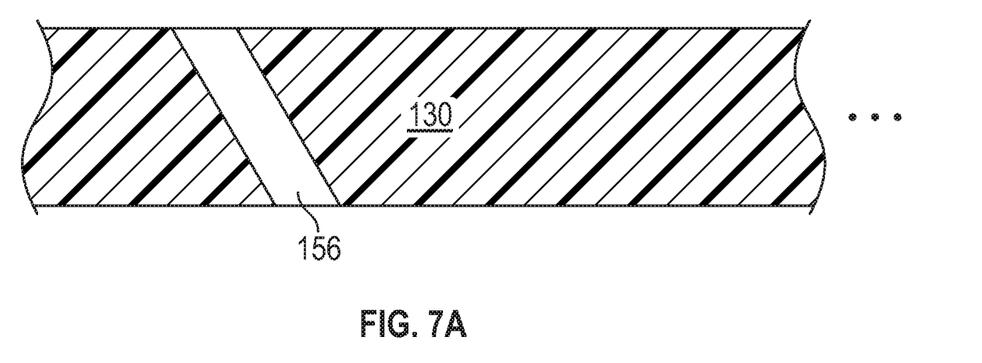
FIG. 7A is a cross-sectional view taken along line 7A-7A of FIG. 7.
Figure 7B:
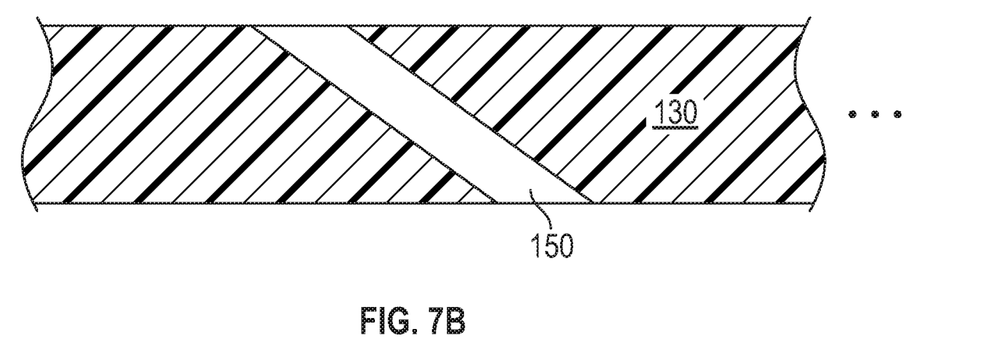
FIG. 7B is a cross-sectional view taken along line 7B-7B of FIG. 7.

Referring to FIGS. 7, 7A and 7B, the gas path flow direction 160 that approaches the leading edge 132 is shown. As illustrated, the first cooling holes 150 are inclined toward the leading edge 132, but are not angularly oriented directly upstream since the gas flow path direction 160 is typically at an inclined direction upstream of the cooling holes 150.

The second group of outlets 154 of the second group of cooling holes 156 has a second leading edge distance 170 that is greater than a first leading edge distance 172 of first group of outlets 152 of the first cooling holes 150. Each "leading edge distance" is a measurement based on the shortest distance between the leading edge 132 and the outlet 152 or 154. In some embodiments, the second leading edge distance 170 ranges from about 3 to about 4 times the first leading edge distance 172. In an embodiment, the second leading edge distance 170 is about 3.4 times the first leading edge distance 172.

The embodiments disclosed herein provide improved cooling performance around the leading edge 132 of the aft combustor panels 130. The cooling hole arrangement 140 ensures that film cooling is distributed evenly and that no large areas occur with no film cooling.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A cooling hole arrangement for a combustor panel comprising:
    a plurality of cooling holes that are located closest to an edge of the combustor panel, relative to every other cooling holes of the combustor panel, the plurality of cooling holes comprising:
        a first group of cooling holes located in a first row, each of the first group of cooling holes extending from a first inlet to a first outlet; and
        a second group of cooling holes located in a second row adjacent to the first row, each of the second group of cooling holes extending from a second inlet to a second outlet, each of the first group of cooling holes and the second group of cooling holes spaced from the edge of the combustor panel in an axial direction to be arranged parallel to the edge of the combustor panel, wherein the first row is located closer to the edge of the combustor panel than the second row,
        wherein at least a portion of the first inlet of each first group of cooling holes axially overlapped with a portion of the second inlet of the second group of cooling holes,
        the first outlet of each of the first group of cooling holes being closer to the edge of the combustor panel than the second outlet of the second group of cooling holes is to the edge.

2. The cooling hole arrangement of claim 1, wherein each of the first group of cooling holes extend from the first inlet to the first outlet at a first angular orientation, each of the second group of cooling holes extending from the second inlet to the second outlet at a second angular orientation, the first angular orientation ranging from about 10 degrees to about 50 degrees relative to a circumferential direction.

3. The cooling hole arrangement of claim 1, wherein each of the first group of cooling holes extend from the first inlet to the first outlet at a first angular orientation, each of the second group of cooling holes extending from the second inlet to the second outlet at a second angular orientation, the second angular orientation ranging from about −15 degrees to about 15 degrees relative to a circumferential direction.

4. The cooling hole arrangement of claim 1, wherein a distance between the second outlet and the edge is about 3 times to about 4 times greater than the distance between the first outlet and the edge.

5. The cooling hole arrangement of claim 1, wherein a distance between the second outlet and the edge is about 3.4 times greater than the distance between the first outlet and the edge.

6. The cooling hole arrangement of claim 1, wherein each of the first group of cooling holes extend from the first inlet to the first outlet at a first angular orientation, the first angular orientation not parallel to an oncoming gas flow path direction.

7. A cooling hole arrangement for a combustor panel comprising: a plurality of cooling holes that are located closest to a leading edge of the combustor panel, relative to every other cooling holes of the combustor panel, the plurality of cooling holes comprising: a first group of cooling holes located in a first row, the first group of cooling holes having a first angular orientation; and a second group of cooling holes located in a second row adjacent to the first row, the second group of cooling holes having a second angular orientation, wherein the first angular orientation different than the second angular orientation, each of the first group of cooling holes and the second group of cooling holes spaced from the leading edge of the combustor panel in an axial direction to be arranged parallel to the leading edge of the combustor panel, wherein the first row is located closer to the edge of the combustor panel than the second row, wherein each of the first group of cooling holes extends from a first inlet to a first outlet, each of the second group of cooling holes extending from a second inlet to a second outlet, at least a portion of the first inlet of each first group of cooling holes axially overlapped with a portion of the second inlet of the second group of cooling holes.

8. The cooling hole arrangement of claim 7, wherein the first outlet of each of the first group of cooling holes is closer to a leading edge of the combustor panel than the second outlet of the second group of cooling holes is to the leading edge.

9. The cooling hole arrangement of claim 7, wherein the first angular orientation ranges from about 10 degrees to about 50 degrees relative to a circumferential direction.

10. The cooling hole arrangement of claim 7, wherein the second angular orientation ranging from about −15 degrees to about 15 degrees relative to a circumferential direction.

11. The cooling hole arrangement of claim 8, wherein a distance between the second outlet and the leading edge is about 3 times to about 4 times greater than the distance between the first outlet and the leading edge.

12. The cooling hole arrangement of claim 7, wherein the first angular orientation is not parallel to an oncoming gas flow path direction.

13. A gas turbine engine comprising:
a compressor section;
a combustor section;
a turbine section; and
a cooling hole arrangement for a combustor panel of the combustor section, the combustor panel extending axially from a leading edge to a trailing edge, the cooling hole arrangement comprising:
a plurality of cooling holes that are located closest to the leading edge of the combustor panel, relative to every other cooling holes of the combustor panel, the plurality of cooling holes comprising:
a first group of cooling holes located in a first row, the first group of cooling holes having a first angular orientation; and
a second group of cooling holes located in a second row adjacent to the first row, the second group of cooling holes having a second angular orientation, the first angular orientation different than the second angular orientation, each of the first group of cooling holes and the second group of cooling holes spaced from the leading edge of the combustor panel in an axial direction to be arranged parallel to the leading edge of the combustor panel,
wherein the first row is located closer to the edge of the combustor panel than the second row.

14. The gas turbine engine of claim 13, wherein each of the first group of cooling holes extends from a first inlet to a first outlet, each of the second group of cooling holes extending from a second inlet to a second outlet, at least a portion of the first inlet of each first group of cooling holes axially overlapped with a portion of the second inlet of the second group of cooling holes, the first outlet of each of the first group of cooling holes being closer to a leading edge of the combustor panel than the second outlet of the second group of cooling holes is to the leading edge.

15. The gas turbine engine of claim 13, wherein the first angular orientation ranges from about 10 degrees to about 50 degrees relative to the circumferential direction.

* * * * *